US010465762B2

(12) United States Patent
Nishi et al.

(10) Patent No.: US 10,465,762 B2
(45) Date of Patent: Nov. 5, 2019

(54) TUBULAR VIBRATION-DAMPING DEVICE

(71) Applicant: Sumitomo Riko Company Limited, Aichi (JP)

(72) Inventors: Naoki Nishi, Aichi (JP); Yuuki Ishigaki, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 18 days.

(21) Appl. No.: 15/896,425

(22) Filed: Feb. 14, 2018

(65) Prior Publication Data

US 2018/0328433 A1 Nov. 15, 2018

Related U.S. Application Data

(63) Continuation of application No. PCT/JP2017/017989, filed on May 12, 2017.

(51) Int. Cl.

*F16F 1/38* (2006.01)
*B60G 21/05* (2006.01)
*B60K 5/12* (2006.01)

(52) U.S. Cl.

CPC .......... *F16F 1/3835* (2013.01); *B60G 21/052* (2013.01); *B60K 5/1208* (2013.01); *B60K 5/1283* (2013.01); *B60K 5/1291* (2013.01); *F16F 1/3828* (2013.01); *B60Y 2306/09* (2013.01)

(58) Field of Classification Search

CPC ........ F16F 1/3835; F16F 1/3828; F16F 1/387; B60K 5/1291

See application file for complete search history.

(56) References Cited

U.S. PATENT DOCUMENTS

| | | | | |
|---|---|---|---|---|
| 4,032,202 | A * | 6/1977 | Ishikawa | B60G 7/00 267/280 |
| 5,725,202 | A * | 3/1998 | Nakamura | F16F 1/3835 267/140.12 |
| 6,655,666 | B2 * | 12/2003 | Tamura | F16F 13/14 267/140.12 |

(Continued)

OTHER PUBLICATIONS

International Search Report in International Patent Application No. PCT/JP2017/017989, dated Jul. 18, 2017, along with English-language translation.

*Primary Examiner* — Bradley T King

(74) *Attorney, Agent, or Firm* — Greenblum & Bernstein, P.L.C.

(57) ABSTRACT

A tubular vibration-damping device including: a vibration-damping device main unit wherein a main rubber elastic body is externally fixed to an inner shaft member; an outer tube member mounted on an outer peripheral face of the main unit; a pair of stopper protrusions protruding to opposite sides of a first axis-perpendicular direction at the inner shaft member; a cushion rubber layer fixed to the stopper protrusions; a stopper concavity provided in an inner peripheral face of the outer tube member to receive the stopper protrusions being inserted, with a wall opposed to the stopper protrusions in an axial direction, the first axis-perpendicular direction, and a second axis-perpendicular direction orthogonal thereto; and stoppers for all the directions constituted by contact of the wall and the stopper protrusions to limit relative displacement between the inner shaft member and the outer tube member.

10 Claims, 14 Drawing Sheets

(56) References Cited

U.S. PATENT DOCUMENTS

| | | | | |
|---|---|---|---|---|
| 2002/0053763 | A1* | 5/2002 | Kuwayama ............ | F16F 1/387 267/136 |
| 2014/0210148 | A1 | 7/2014 | Eguchi et al. | |
| 2014/0291094 | A1* | 10/2014 | Goetz .................... | F16F 7/108 188/380 |
| 2017/0299008 | A1* | 10/2017 | Satou ...................... | B60K 5/12 |
| 2018/0172109 | A1* | 6/2018 | Nishi ...................... | F16F 3/087 |

* cited by examiner

TUBULAR VIBRATION-DAMPING DEVICE

INCORPORATED BY REFERENCE

This application is a Continuation of International Application No. PCT/JP2017/017989 filed May 12, 2017, the disclosure of which is expressly incorporated herein by reference in its entirety.

BACKGROUND OF THE INVENTION

1. Field of the Invention

The present invention relates to a tubular vibration-damping device for use, for example, in automotive differential mounts, engine mounts, body mounts, member mounts, and the like.

2. Description of the Related Art

Conventionally, tubular vibration-damping devices have been known as one type of vibration damping connecting components interposed between components that make up a vibration transmission system in order to provide vibration damping linkage between the components. The application of such tubular vibration-damping devices to a differential mount and the like wherein the vehicle body (sub frame) supports an automotive differential gear in a vibration-damping manner, for example, has been studied. As shown in U.S. Publication No. US 2014/0210148 or the like, for example, this tubular vibration-damping device has a structure in which an inner shaft member and an outer cylindrical member are elastically connected by a main rubber elastic body.

For the tubular vibration-damping device disclosed in US 2014/0210148, the axially center portion of the inner shaft member is provided with a stopper member including a pair of first stopper protrusions and a pair of second stopper protrusions that protrude in axis-perpendicular directions orthogonal to each other. The stopper protrusions are abutted on the side of the outer cylindrical member in each of the axis-perpendicular directions, thus constituting stoppers limiting the relative displacement amount between the inner shaft member and the outer cylindrical member. Consequently, the durability of the main rubber elastic body improves.

The main rubber elastic body is fixed on the first stopper protrusion, while the outer peripheral rubber stopper formed integrally with the main rubber elastic body is fixed on the protruding tip face of the first stopper protrusion. This moderates striking noise etc. during the contact between the first stopper protrusion and the side of the outer cylindrical member.

However, as a result of the inventors' study about the tubular vibration-damping device disclosed in US 2014/0210148 on the assumption of a larger input load, the inventors got a finding that further improvement of the durability is preferable. Specifically, with the structure of US 2014/0210148, the main rubber elastic body and an outer peripheral rubber stopper are integrally formed and both of them are fixed to the first stopper protrusions. In addition, a portion of the outer peripheral rubber stopper where the stopper load is input is disposed continuously at a position close to the main rubber elastic body. As a result, if cracking occurs in the outer peripheral rubber stopper by the input of the large stopper load, the cracking in the outer peripheral rubber stopper is thought to spread to the main rubber elastic body provided continuously in the proximity of the outer peripheral rubber stopper, which may affect the durability of the main rubber elastic body adversely.

SUMMARY OF THE INVENTION

The present invention has been developed in view of the above-described matters as the background, and it is an object of the present invention to provide a tubular vibration-damping device with a novel structure which is able to secure excellent durability avoiding an effect on the durability of the main rubber elastic body, even if a stopper load acts on the cushion rubber layer formed integrally with the main rubber elastic body and cracking occurs.

The above and/or optional objects of this invention may be attained according to at least one of the following modes of the invention. The following modes and/or elements employed in each mode of the invention may be adopted at any possible optional combinations.

Specifically, a first mode of the present invention provides a tubular vibration-damping device comprising: a vibration-damping device main unit having an inner shaft member and a main rubber elastic body fixed to an outer peripheral face of the inner shaft member; a tubular outer tube member mounted on an outer peripheral face of the vibration-damping device main unit; a pair of stopper protrusions protruding to opposite sides of a first axis-perpendicular direction at an axially middle portion of the inner shaft member; a cushion rubber layer formed integrally with the main rubber elastic body and fixed to faces of the pair of stopper protrusions; a stopper concavity provided in an inner peripheral face of the outer tube member such that the stopper concavity receives the pair of stopper protrusions being inserted, the stopper concavity having a wall opposed to the stopper protrusions in each of an axial direction, the first axis-perpendicular direction, and a second axis-perpendicular direction orthogonal to the first axis-perpendicular direction; and an axial direction stopper, a first axis-perpendicular direction stopper, and a second axis-perpendicular direction stopper being constituted by contact of the wall of the stopper concavity and the stopper protrusions such that the axial direction stopper, the first axis-perpendicular direction stopper, and the second axis-perpendicular direction stopper limit relative displacement amount between the inner shaft member and the outer tube member.

In this tubular vibration-damping device constructed following the first mode, the pair of stopper protrusions provided at the inner shaft member and the wall of the stopper concavity provided in the outer tube member are abutted. Thus, the relative displacement amount between the inner shaft member and the outer tube member is limited in each of the axial direction, the first axis-perpendicular direction, and the second axis-perpendicular direction. As a result, the durability of the main rubber elastic body improves.

Also, the stoppers are constituted by the pair of stopper protrusions. Therefore, even if cracking occurs in the cushion rubber layer covering the faces of the pair of stopper protrusions, cracking hardly spreads to the main rubber elastic body, thus preventing reduction in the durability of the main rubber elastic body.

A second mode of the present invention provides the tubular vibration-damping device according to the first mode, wherein a pair of fixation protrusions are provided at the axially middle portion of the inner shaft member while protruding to opposite sides of the second axis-perpendicular direction, and the main rubber elastic body is fixed to the pair of fixation protrusions.

According to the second mode, the main rubber elastic body is fixed to the pair of fixation protrusions that protrude in a direction roughly orthogonal to the pair of stopper protrusions. By so doing, damage in the cushion rubber layer that covers the pair of stopper protrusions is even less likely to affect the main rubber elastic body formed integrally with the cushion rubber layer. Thus, the durability of the main rubber elastic body improves. Additionally, a large fixation area of the main rubber elastic body on the side of the inner shaft member is kept by the pair of fixation protrusions, so that the main rubber elastic body is more firmly fixed to the side of the inner shaft member, and abrasion in relation to the inner shaft member hardly becomes a problem.

A third mode of the present invention provides the tubular vibration-damping device according to the second mode, wherein the fixation protrusions and the stopper protrusions are integrally formed as a separate member from the inner shaft member, and the fixation protrusions and the stopper protrusions are firmly provided at the inner shaft member.

According to the third mode, it is possible to realize both the performance required for the inner shaft member and the performance required for the fixation protrusions and the stopper protrusions at a higher degree. Specifically, for example, it is possible to obtain excellent deformation rigidity by forming the inner shaft member with a metal, and lighten the fixation protrusions and the stopper protrusions by forming them with a synthetic resin.

A fourth mode of the present invention provides the tubular vibration-damping device according to any one of the first through third modes, wherein at least one medium member is disposed separately from the inner shaft member on an outer peripheral side thereof, and the inner shaft member and the at least one medium member are elastically connected to each other by the main rubber elastic body so that the inner shaft member, the medium member, and the main rubber elastic body constitute the vibration-damping device main unit, while the medium member is fitted to the inner peripheral face of the outer tube member so that the outer tube member is mounted to the outer peripheral face of the vibration-damping device main unit.

According to the fourth mode, the outer peripheral shape of the main rubber elastic body is stabled by the medium member, thereby facilitating the attachment of the outer tube member on the outer peripheral face of the vibration-damping device main unit.

A fifth mode of the present invention provides the tubular vibration-damping device according to the fourth mode, wherein the at least one medium member comprises a pair of medium members, and the pair of medium members are disposed separately on opposite sides of the inner shaft member in the second axis-perpendicular direction, and the inner shaft member and the pair of medium members are elastically connected to one another by the main rubber elastic body, while the pair of medium members are fitted to the inner peripheral face of the outer tube member.

According to the fifth mode, the medium member comprises a pair disposed at opposite sides of the inner shaft member in the second axis-perpendicular direction. Therefore, when the outer tube member is mounted on the outer peripheral face of the vibration-damping device main unit, the pair of medium members are pressed in the mutual approach direction. By so doing, pre-compression can be performed on the main rubber elastic body disposed between the inner shaft member and the medium members in the second axis-perpendicular direction. This decreases the tensile stress acting on the main rubber elastic body during the vibration input in the second axis-perpendicular direction, for example, enabling the improvement in the durability of the main rubber elastic body.

A sixth mode of the present invention provides the tubular vibration-damping device according to any one of the first through fifth modes, wherein the main rubber elastic body has a recess opening to an outer periphery at each side of the second axis-perpendicular direction, and an inner face of the recess constituted by the main rubber elastic body is a free surface.

According to the sixth mode, a large free surface for the main rubber elastic body is ensured, thereby preventing damage on the main rubber elastic body due to stress concentration during the elastic deformation of the main rubber elastic body, so that the durability of the main rubber elastic body improves. Especially, the recess is provided in a middle portion of the outer peripheral surface of the main rubber elastic body constrained by the fixation to the other member. By so doing, the area of the main rubber elastic body whose elastic deformation is constrained is efficiently decreased, thus effectively moderating the stress concentration in the main rubber elastic body during the vibration input.

A seventh mode of the present invention provides the tubular vibration-damping device according to the sixth mode, wherein a communication passage is formed in the main rubber elastic body such that the communication passage opens the recess to an atmosphere.

According to the seventh mode, the action of the air spring in the recess is avoided, whereby the air spring can be prevented from affecting the spring characteristics of the tubular vibration-damping device. Moreover, if water etc. enters the recess, it is also possible to discharge it through the communication passage.

An eighth mode of the present invention provides the tubular vibration-damping device according to any one of the first through seventh modes, wherein the outer tube member includes a pair of division units mounted to the vibration-damping device main unit from the opposite sides of the first axis-perpendicular direction.

According to the eighth mode, the outer tube member can be readily mounted on the outer peripheral face of the vibration-damping device main unit. Besides, the division direction of the outer tube member is the first axis-perpendicular direction. Therefore, the divided sections of the outer tube member are positioned at the both sides of the second axis-perpendicular direction, whereby the stopper protrusions protruding in the first axis-perpendicular direction do not touch the divided sections of the outer tube member. Consequently, it is possible to avoid the stopper load from acting on the divided sections of the outer tube member, thus preventing damage of the outer tube member having the division structure.

A ninth mode of the present invention provides the tubular vibration-damping device according to the eighth mode, wherein a first engaging part and a second engaging part configured to be engaged in each other by approach of the pair of division units are provided at butting ends of the pair of division units butted to each other, and the pair of division units are positioned relative to one another by engagement of the first engaging part and the second engaging part in a direction of the engagement, while the pair of division units are permitted to be relatively displaced in a direction orthogonal to the direction of the engagement of the first engaging part and the second engaging part.

With the ninth mode, by having the pair of division units approach each other and thus engaging the first engaging part and the second engaging part formed at the ends of the pair of division units, it is possible to easily provide the tubular outer tube member mounted on the outer peripheral face of the vibration-damping device main unit. Additionally, the pair of division units are configured to be connected by the engagement of the first engaging part and the second engaging part. Thus, the connection strength for the pair of division units is more easily set depending on the necessity, in the engagement direction of the first engaging part and the second engaging part, which is the butting direction for the ends of the pair of division units. This makes it possible to connect the pair of division units with sufficient strength.

Moreover, in the direction orthogonal to the engagement direction of the first engaging part and the second engaging part, the pair of division units are allowed to be displaced relatively. This makes it possible to prevent the pair of division units from being fixed as a mutual deviation state in the axial direction or the axis-perpendicular direction. Therefore, for example when the outer tube member is inserted or press-fitted in the attachment target member such as the vehicle body so as to be mounted thereto, it is also possible to move the pair of division units to an appropriate relative position in the direction orthogonal to the engagement direction of the first engaging part and the second engaging part. Consequently, the outer tube member can be mounted to the attachment target member without being affected by assembly error of the pair of division units, etc.

According to this invention, the pair of stopper protrusions provided at the inner shaft member are abutted on the walls of the stopper concavities provided in the outer tube member. This contact limits the relative displacement amount between the inner shaft member and the outer tube member in each of the axial direction, the first axis-perpendicular direction, and the second axis-perpendicular direction, thereby improving the durability of the main rubber elastic body. Since the stoppers are constituted by the pair of stopper protrusions, even if cracking occurs in the cushion rubber layer covering the faces of the pair of stopper protrusions, the cracking hardly spreads to the main rubber elastic body, thus avoiding an effect on the durability of the main rubber elastic body.

BRIEF DESCRIPTION OF THE DRAWINGS

The foregoing and/or other objects, features and advantages of the invention will become more apparent from the following description of an embodiment with reference to the accompanying drawings in which like reference numerals designate like elements and wherein.

DETAILED DESCRIPTION OF EMBODIMENTS

Figure 1:
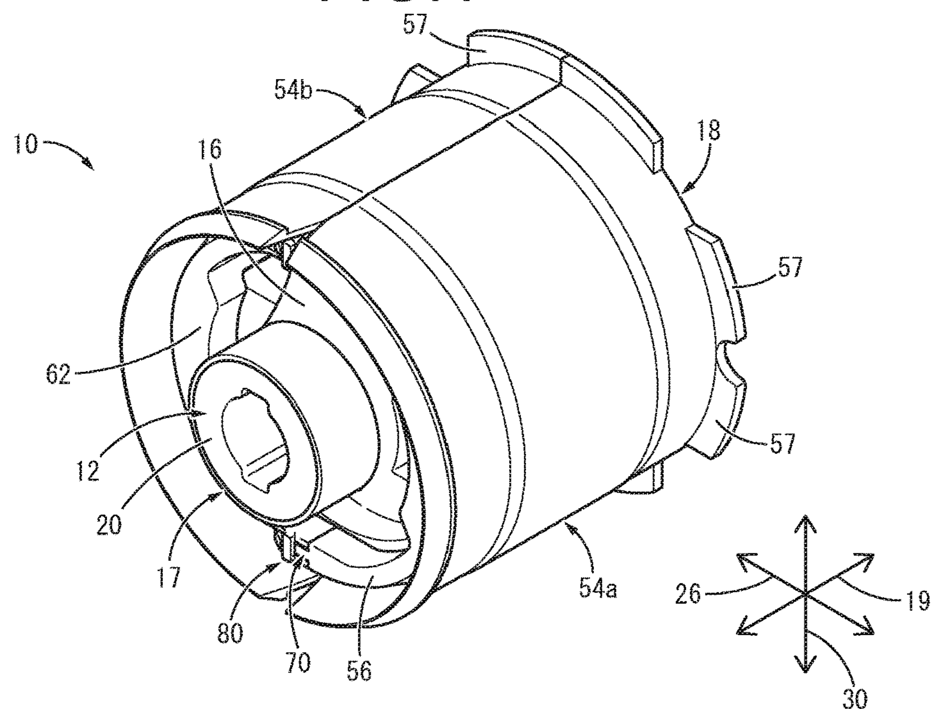
FIG. 1 is a perspective view showing a tubular vibration-damping device in the form of a differential mount as a first embodiment of the present invention.
Figure 2:
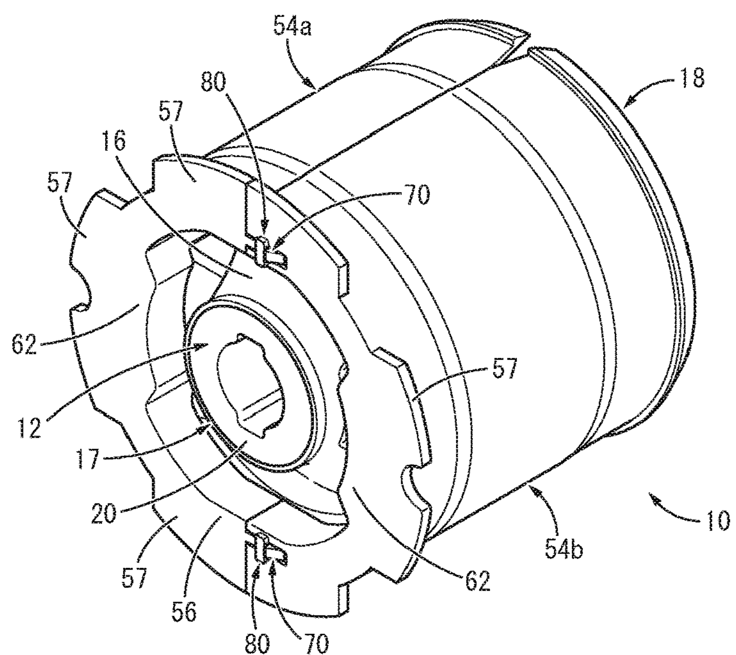
FIG. 2 is a perspective view showing the differential mount of FIG. 1 from another angle.
Figure 3:
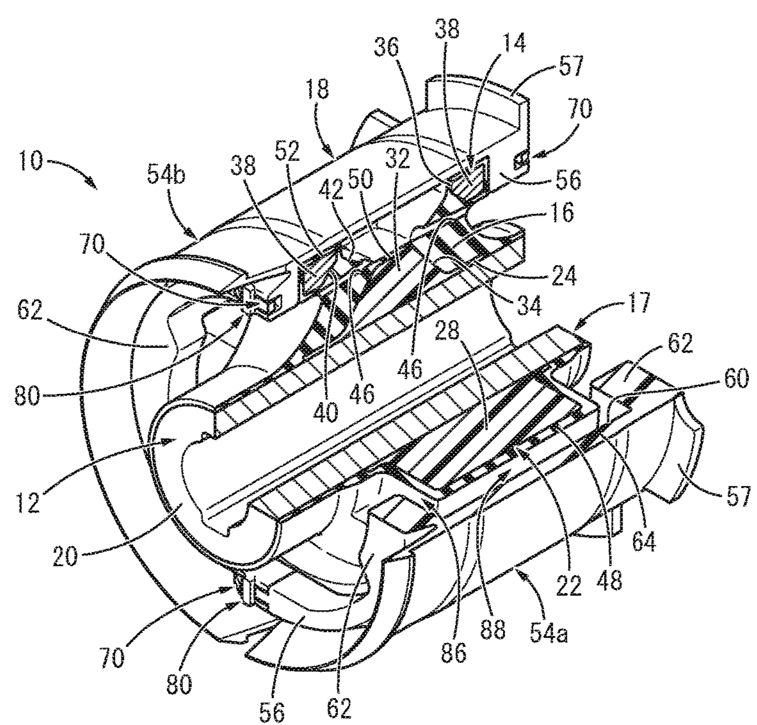
FIG. 3 is a perspective view showing a part of the differential mount shown in FIG. 1, with a cross section.
Figure 4:
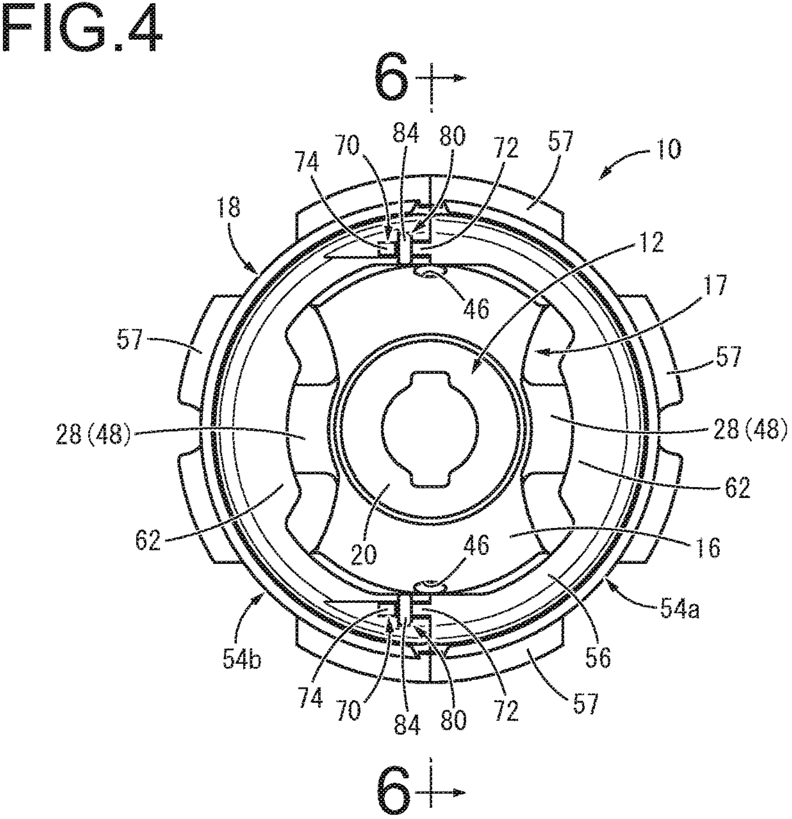
FIG. 4 is a left side view of the differential mount shown in FIG. 1.
Figure 5:
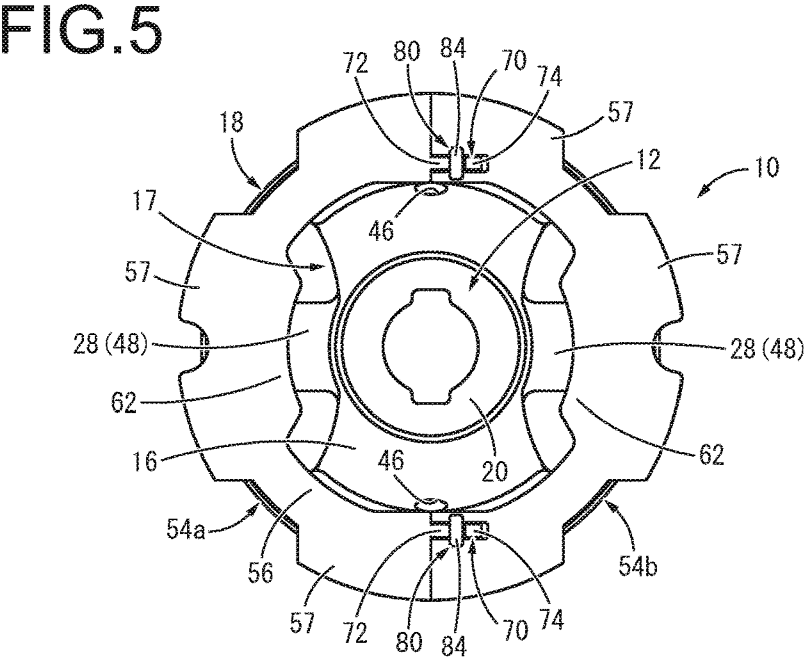
FIG. 5 is a right side view of the differential mount shown in FIG. 1.

An embodiment of the present invention will be described below in reference to the drawings.

FIGS. 1 to 8 show an automotive differential mount 10 as a first embodiment of a tubular vibration-damping device having a structure according to the present invention. As FIGS. 9 to 13 show, the differential mount 10 has a mount main unit 17 as a vibration-damping device main unit that includes an inner shaft member 12, a medium member 14, and a main rubber elastic body 16 elastically connecting the inner shaft member 12 and the medium member 14. Additionally, as FIGS. 3 to 8 show, an outer tube member 18 is externally fitted on and about the medium member 14 of the mount main unit 17, whereby the differential mount 10 has a structure wherein the inner shaft member 12 and the outer tube member 18 are elastically connected to each other by the main rubber elastic body 16. In the explanation hereinafter, as a general rule, the front-back direction means the left-right direction in FIG. 6, which is an axial direction 19. Also, the left-right direction means the left-right direction in FIG. 8, which is a first axis-perpendicular direction 26 described later, and the up-down direction means the up-down direction in FIG. 8, which is a second axis-perpendicular direction 30 described later. The axial direction 19, the first axis-perpendicular direction 26, and the second axis-perpendicular direction 30 are directions shown by arrows in FIGS. 1 and 6 to 8. The arrow figure showing the directions in FIG. 1 (FIGS. 6 to 8) is an explanatory view that expresses with its center as the elastic center of the main rubber elastic body 16. Moreover, in the explanation below, the code for each direction may be omitted as appropriate.

More specifically, the inner shaft member 12 is a high rigidity member made of metal, synthetic resin, or the like. In the present embodiment, as FIGS. 12 to 17 show, the inner shaft member 12 has a structure wherein a stopper member 22 is attached to an axially middle portion of an attachment shaft member 20.

The attachment shaft member 20 has a small-diameter generally cylindrical shape extending linearly. In this embodiment, the diameter of the inner hole of the attachment shaft member 20 is partly expanded in the circumferential direction. However, the specific shape of the inner hole of the attachment shaft member 20 is not particularly limited, and a circular cross section, an oval cross section, and the like can be used, for example.

The stopper member 22 is formed as a separate member from the attachment shaft member 20, using a metal, a synthetic rein, or the like. The stopper member 22 includes a fixation tubular part 24 in a tubular shape and has a structure wherein a pair of stopper protrusions 28, 28 protruding in the left-right direction, which is the first axis-perpendicular direction 26, and a pair of fixation protrusions 32, 32 protruding in the up-down direction, which is the second axis-perpendicular direction 30, are formed integrally with the fixation tubular part 24.

More specifically, the stopper protrusion 28 of the stopper member 22 protrudes with a roughly fixed rectangular cross section, and its protruding tip face is curved in the circumferential direction of the fixation tubular part 24. On the other hand, the fixation protrusion 32 of the stopper member 22 has a substantially truncated quadrangular pyramid shape that is tapered toward the protruding tip, and its side face is a slanting side face 34 that slants inward in the front-back direction or the left-right direction toward the protruding tip. Besides, in this embodiment, the stopper protrusion 28 has a smaller circumferential width and a larger front-back length than those of the fixation protrusion 32. The fixation protrusion 32 is not indispensable, and the stopper member 22 may have a structure wherein only the pair of stopper protrusions 28, 28 are provided in the fixation tubular part 24.

With the attachment shaft member 20 inserted in the inner hole of the fixation tubular part 24, the inner peripheral face of the fixation tubular part 24 and the outer peripheral face of the attachment shaft member 20 are fixed. By so doing, the stopper member 22 is fixed to the axially middle portion of the attachment shaft member 20. As a result, the pair of stopper protrusions 28, 28 and the pair of fixation protrusions 32, 32 are firmly provided protruding in axis-perpendicular directions substantially orthogonal to each other peripherally outward from the attachment shaft member 20.

The stopper member 22 may be later fixed to the attachment shaft member 20, by inserting the attachment shaft member 20 in the fixation tubular part 24, and fixing the superposed faces of the attachment shaft member 20 and the fixation tubular part 24 by such means as welding and adhesion. Alternatively, the stopper member 22 can be fixed to the attachment shaft member 20 on molding, by molding the stopper member 22 on the outer peripheral face of the attachment shaft member 20. This embodiment has a structure wherein the pair of stopper protrusions 28, 28 and the pair of fixation protrusions 32, 32 are provided in the stopper member 22 which is separate from the attachment shaft member 20, and are fixed to the attachment shaft member 20. Alternatively the pair of stopper protrusions 28, 28 and the pair of fixation protrusions 32, 32 are integrally formed with the attachment shaft member 20, thereby constituting the inner shaft member 12 with a single member.

Figure 18:
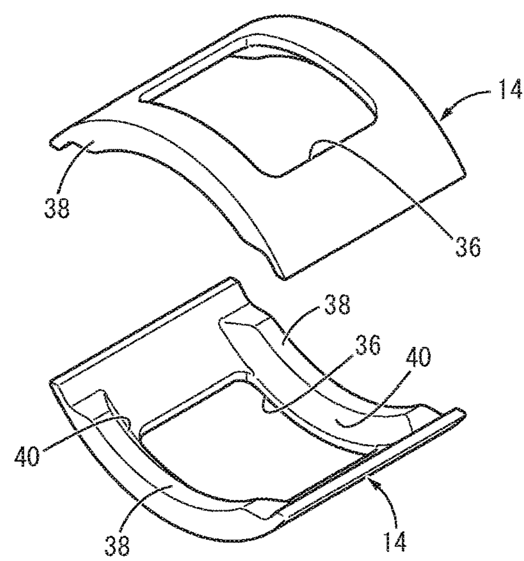
FIG. 18 is a perspective view of a pair of medium members constituting the mount main unit of FIG. 9.
Figure 19:
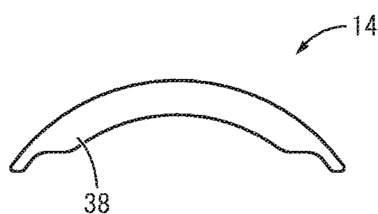
FIG. 19 is a left side view of the medium member of FIG. 18.
Figure 20:
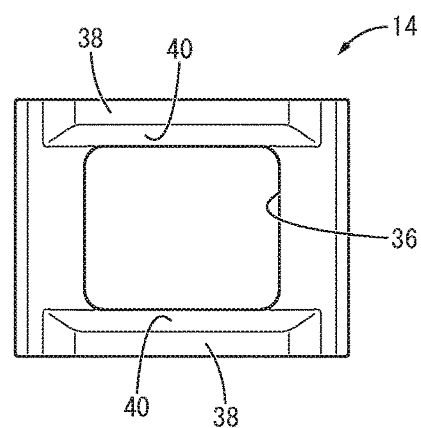
FIG. 20 is a bottom view of the medium member of FIG. 18.
Figure 21:
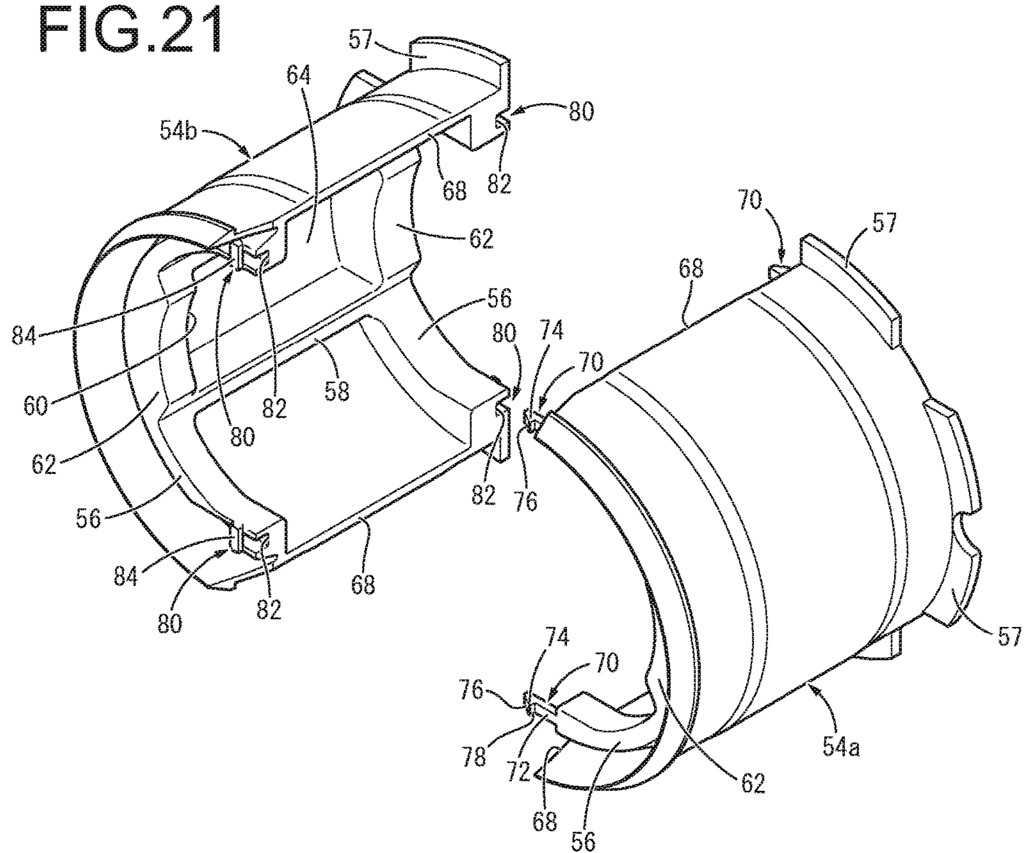
FIG. 21 is an exploded perspective view of an outer tube member of the differential mount of FIG. 1.
Figure 22:
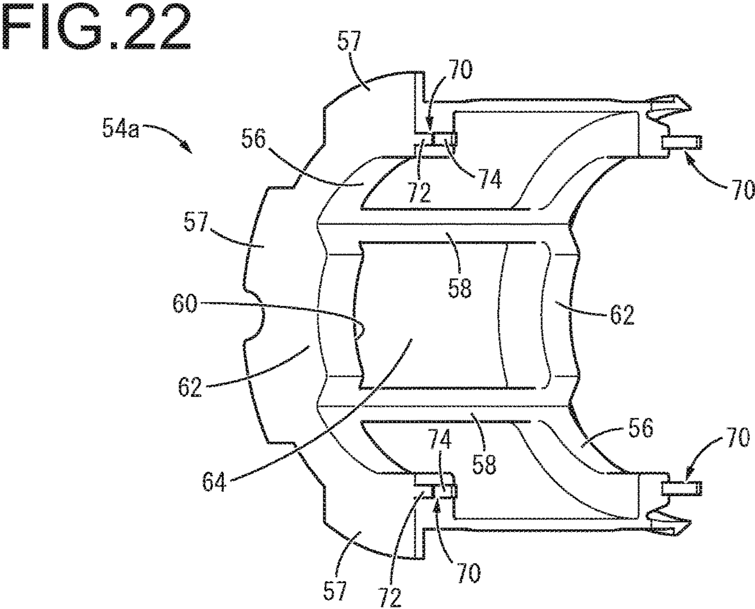
FIG. 22 is a perspective view of one division unit shown in FIG. 21.
Figure 23:
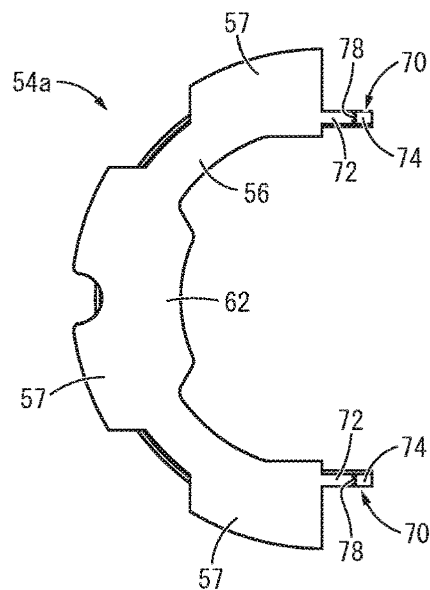
FIG. 23 is a right side view of the division unit shown in FIG. 21.
Figure 24:
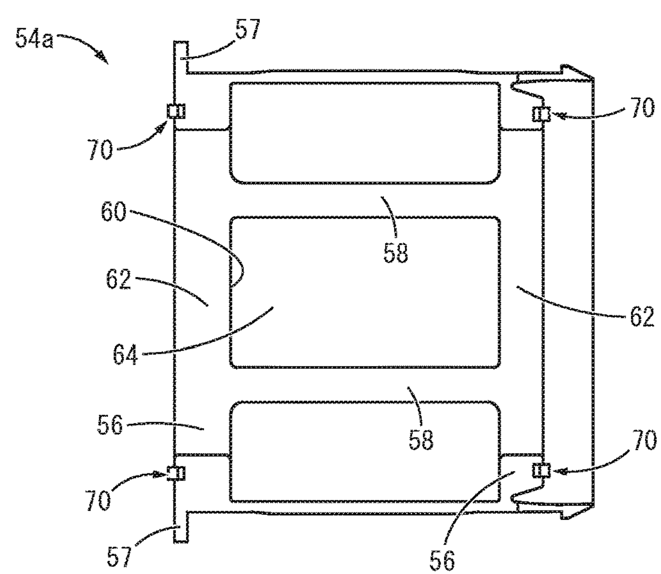
FIG. 24 is a rear view of the division unit shown in FIG. 21.

Meanwhile, the medium member 14 is a rigid member made of metal, synthetic resin, or the like. As FIGS. 18 to 20 show, the medium member 14 has a curved plate shape that is curved in a nearly arcuate form as a whole. In the medium member 14, a window 36 of nearly rectangular hole shape is formed penetrating in the thickness direction, through the circumferentially and axially middle portion.

With each of the axial ends of the medium member 14, a rubber support part 38 is integrally formed protruding radially inward while extending in the circumferential direction. The rubber support parts 38 of the present embodiment are provided at both axial outsides of the window 36 while extending further outside than the window 36 in the circumferential direction. The face on the side of the window 36 (the axial inside) is an inside incline 40 that inclines axially outward as it goes to the inner circumference.

The pair of medium members 14, 14 are disposed separately from the inner shaft member 12 to the respective sides of the second axis-perpendicular direction 30. The inner shaft member 12 and the pair of medium members 14, 14 are elastically connected to each other by the main rubber elastic body 16, thus constituting the mount main unit 17. As FIGS. 10, 12, 13, and the like show, the main rubber elastic body 16 is disposed between the inner shaft member 12 and the pair of medium members 14, 14 in the second axis-perpendicular direction 30 (the up-down direction).

Furthermore, in the main rubber elastic body 16, a recess 42 is formed opening to the radial outside through the window 36 of the medium member 14. This recess 42 is provided opening to the outer peripheral face of the main rubber elastic body 16 at each side of the second axis-perpendicular direction 30. The recess 42 has a tapered wall inner face whose front-back dimension and left-right dimension get smaller as it goes radially inward. In addition, since the recess 42 is formed in the main rubber elastic body 16, the main rubber elastic body 16 has a cross sectional shape that slants to at least one outside in the axial direction and the circumferential direction as it goes to the radial outside (the outer peripheral side).

With respect to the main rubber elastic body 16 having this incline cross sectional shape, the radial inside end is fixed to the slanting side face 34 of the fixation protrusion 32 provided at the stopper member 22, while the radial outside end is bonded to the inside incline 40 of the rubber support part 38 of the medium member 14. Besides, the main rubber elastic body 16 is provided continuously in the up-down direction between the inner shaft member 12 and the inside incline 40 of the rubber support part 38 in the medium member 14 in the up-down direction. The main rubber elastic body 16 of the present embodiment has a communication passage 46 that penetrates in the axial direction and opens in the wall face of the recess 42, and the recess 42 opens to the axial outsides through the communication passage 46.

For the stopper protrusion 28 provided at the stopper member 22, the entire face is covered with a cushion rubber layer 48 formed integrally with the main rubber elastic body 16. The protruding tip face of the fixation protrusion 32 of the stopper member 22 is covered with a rubber sheath layer 50 formed integrally with the main rubber elastic body 16. The whole face of the medium member 14 is covered with the main rubber elastic body 16 and a fitting rubber layer 52 formed integrally with the main rubber elastic body 16.

With the inner shaft member 12 and the pair of medium members 14, 14 connected elastically by the main rubber elastic body 16, the pair of medium members 14, 14 are disposed to be remote from the stopper member 22 of the inner shaft member 12 to the radial outside. In this state, the fixation protrusion 32 of the stopper member 22 is positioned relative to the window 36 of the medium member 14. Since the opening of the recess 42 formed in the main rubber elastic body 16 is positioned relative to the window 36 of the medium member 14, the portion of the main rubber elastic body 16 that constitutes the wall inner face of the recess 42 is a free surface that is not constrained by the medium member 14.

On the outer peripheral face of the mount main unit 17 structured in this way, the outer tube member 18 is attached. The outer tube member 18 is made of metal, synthetic resin, or the like, and its entirety has a substantially cylindrical shape as FIGS. 1 to 8 show. Also, as FIGS. 1 to 8 and 21 show, the outer tube member 18 has a configuration of two divided sections combining a pair of division units 54*a*, 54*b* each having a roughly semicircular tube shape.

In the present embodiment, the pair of division units 54*a*, 54*b* are generally identical with each other in shape. One of the division units 54*a* includes a first engaging part 70 described later, while the other division unit 54*b* includes a second engaging part 80 described later, and the outer tube member 18 is constituted by combining these division units 54*a*, 54*b* to face each other. Hereafter, the common structure for the pair of division units 54*a*, 54*b* will be described, and then the structures for the first engaging part 70 and the second engaging part 80 will be described.

Described more specifically, as FIGS. 21 to 24 show, the division unit 54*a*/54*b* has an outer peripheral face that is an arcuate curved shape with a generally constant curvature radius. At both axial sides of the division unit 54*a*/54*b*, inner flange portions 56, 56 are provided extending across the whole circumferential length thereof. With one axial end of the division unit 54*a*/54*b*, an outer flange portion 57 is integrally formed protruding radially outward. Whereas the plurality of outer flange portions 57 are provided intermittently in the circumferential direction in the present embodiment, the outer flange portion 57 may, for example, be provided continuously about the entire circumference, or may alternatively be dispensed with.

Moreover, in the circumferentially middle portion of the division unit 54*a*/54*b*, upper-lower stopper receiving parts 58, 58 are formed protruding in the first axis-perpendicular direction 26 to the radial inside, while extending linearly in the axial direction. The axial ends of the upper-lower stopper receiving parts 58, 58 are integrally connected to the inner flange portions 56, 56. The upper-lower stopper receiving parts 58, 58 are disposed with a prescribed distance in relation to each other in the second axis-perpendicular direction 30.

Consequently, a stopper concavity 60 is formed in the circumferentially center portion of the division unit 54*a*/54*b* so as to open in the first axis-perpendicular direction 26 to the radial inside. This stopper concavity 60 has a peripheral wall of about rectangular tube shape extending in the first axis-perpendicular direction 26. The portions of the inner flange portions 56, 56 that constitute the peripheral wall of the stopper concavity 60 are front-back stopper receiving parts 62, 62, while the base wall of the stopper concavity 60 is a left-right stopper receiving part 64. The both upper and lower side parts in the peripheral wall of the stopper concavity 60 are constituted by the upper-lower stopper receiving parts 58, 58. Thus, the wall of the stopper concavity 60 is constituted by the upper-lower stopper receiving parts 58, 58, the front-back stopper receiving parts 62, 62, and the left-right stopper receiving part 64. Besides, the portion of the inner flange portion 56 that constitutes the front-back stopper receiving part 62 has a larger projection dimension to the radial inside than those of the other parts.

As FIGS. 21 to 24 show, each inner flange portion 56 of one of the division units 54*a* has the first engaging part 70 at a circumferential end 68, which is a butting end. In the present embodiment, the first engaging part 70 provided at one circumferential end 68 of the division unit 54*a* and the first engaging part 70 provided at the other circumferential end 68 of the division unit 54*a* have substantially identical structures relative to each other. However, the both first engaging parts 70 may have structures different from one another. In the same way, the first engaging part 70 provided at one axial end of the division unit 54*a* and the first engaging part 70 provided at the other axial end thereof have substantially identical structures in this embodiment. However, the both first engaging parts 70 may have structures different from one another.

The first engaging part 70 has an elastic support part 72 of elongate plate shape protruding outward in the first axis-perpendicular direction 26 from the circumferential end 68 of the inner flange portion 56 in the division unit 54*a*. At the tip part of the elastic support part 72, there is formed an engaging projection 74 that projects outward in the thickness direction of the elastic support part 72 (the axial direction of the division unit 54*a*).

The projection height of the engaging projection 74 gets smaller as it goes to the distal end side of the elastic support part 72. The end face of the engaging projection 74 positioned on the distal end side is a guide face 76, while the end face of the engaging projection 74 positioned on the proximal end side is an engagement face 78. The guide face 76 expands as inclined relative to the protrusion direction of the elastic support part 72, while the engagement face 78 expands as nearly orthogonal to the protrusion direction of the elastic support part 72, which is the engagement direction in relation to the second engaging part 80 which will be described later.

On the other hand, as FIGS. 1 to 5, 21, and the like show, the inner flange portion 56 of the other division unit 54*b* has the second engaging part 80 at each circumferential end 68, which is a butting end. In this embodiment, the second engaging part 80 provided at one circumferential end 68 of the division unit 54*b* and the second engaging part 80 provided at the other circumferential end 68 of the division unit 54*b* have substantially identical structures to each other. However, the both second engaging parts 80 may have structures different from one another. In the same way, the second engaging part 80 provided at one axial end of the division unit 54*b* and the second engaging part 80 provided at the other axial end of the division unit 54*b* are substantially identical in this embodiment. However, the both second engaging parts 80 may have structures different from one another.

The second engaging part 80 has a structure wherein an insertion groove part 82 is formed opening to the circumferentially outer end face and the axially outer end face of the inner flange portion 56 while extending in the first axis-perpendicular direction 26 nearly orthogonal to the circumferential end face of the division unit 54*b*, and an engaging receiver 84 is provided extending as straddling the axial opening of the insertion groove part 82 of the division unit 54*b*.

Figure 25:
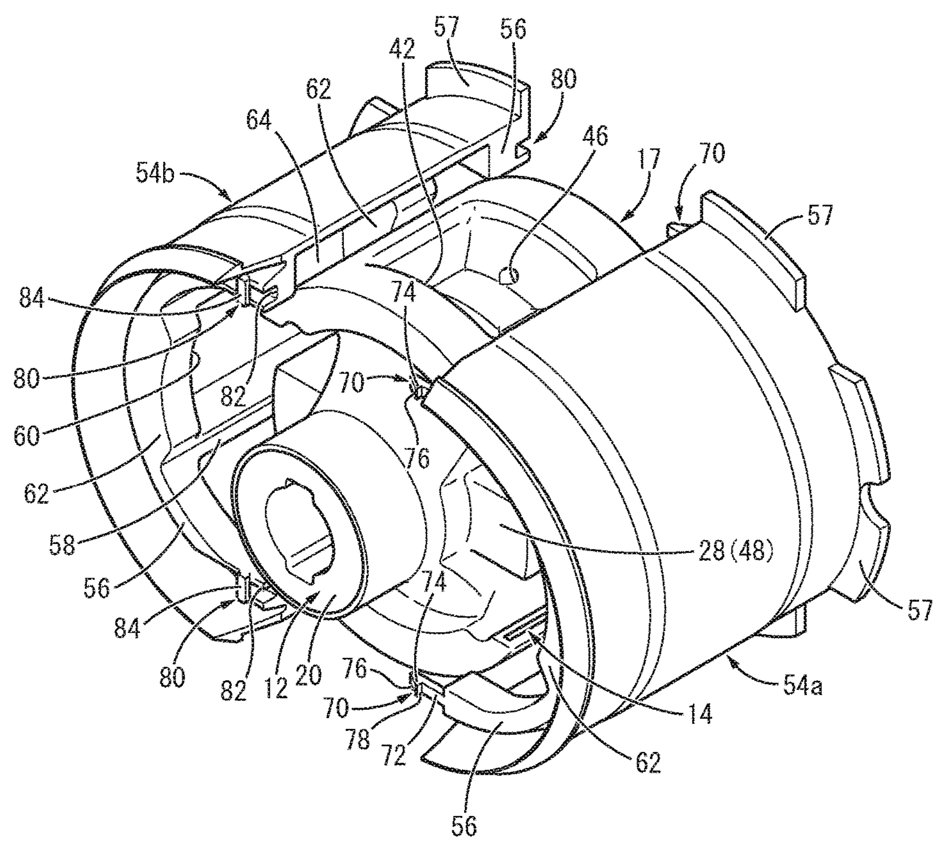
FIG. 25 is a perspective view showing a process of attachment of the outer tube member shown in FIG. 21 on the mount main unit shown in FIG. 9.

As FIG. 25 also shows, the division unit 54*a* including the first engaging part 70 and the division unit 54*b* including the second engaging part 80 described above are made to approach the mount main unit 17 from both sides of the first axis-perpendicular direction 26. Consequently, the circumferential ends 68, 68, which are butted against each other, are connected by the plurality of pairs of the first engaging parts 70 and the second engaging parts 80.

Specifically, the division unit 54*a* and the division unit 54*b* are made to approach each other in the axis-perpendicular direction, whereby each engaging receiver 84 of the second engaging part 80 is abutted against the guide face 76 of each engaging projection 74 of the first engaging part 70. The division unit 54*a* and the division unit 54*b* are made to approach each other while sliding the engaging receiver 84 on and along the guide face 76 of the engaging projection 74, so that the first engaging part 70 is guided into the insertion groove part 82 of the second engaging part 80.

The engaging projection 74 is inserted further circumferentially inside of the division unit 54*b* than the engaging receiver 84, whereby the abutment between the guide face 76 of the engaging projection 74 and the engaging receiver 84 is cancelled. As a result, the engaging projection 74 of the first engaging part 70 is displaced to the axially outer side by elastic recovery force of the elastic support part 72.

Thus, the engagement face 78 of the engaging projection 74 is superposed on the engaging receiver 84, so that the first engaging part 70 and the second engaging part 80 are engaged in each other in the superposition direction of the engaging projection 74 and the engaging receiver 84. As a result, the division unit 54*a* and the division unit 54*b* are mutually connected and positioned by the engagement of the first engaging part 70 and the second engaging part 80, and the connected division units 54*a*, 54*b* constitute the tubular outer tube member 18.

Figure 26:
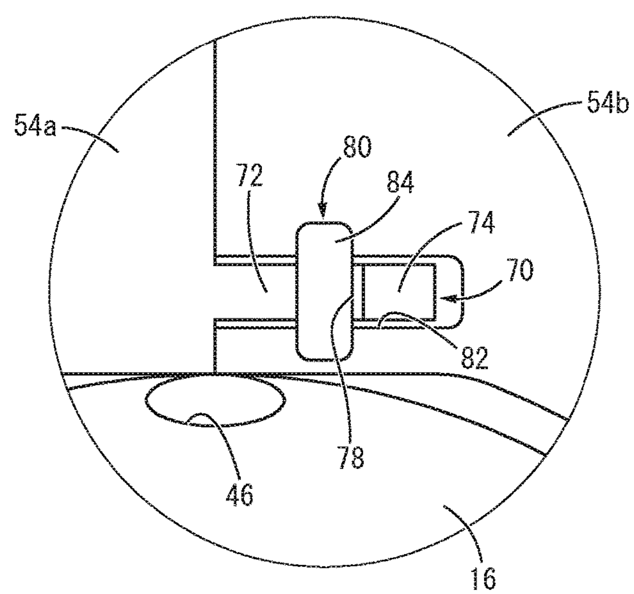
FIG. 26 is an enlarged view of an engagement structure in the outer tube member shown in FIG. 21.

Furthermore, as FIG. 26 shows, the groove width dimension of the insertion groove part 82 of the second engaging part 80 is made larger than the width dimension for the elastic support part 72 and the engaging projection 74 of the first engaging part 70. In addition, the distance between the base wall face of the insertion groove part 82 of the second engaging part 80 and the face of the engaging receiver 84, which are opposed, is made larger than the thickness of the elastic support part 72 of the first engaging part 70.

Thus, when the elastic support part 72 and the engaging projection 74 are inserted in the insertion groove part 82, a gap is formed between the elastic support part 72 constituting the first engaging part 70 and the groove side inner face of the insertion groove part 82 constituting the second engaging part 80. In the same state, a gap is formed also between the elastic support part 72 constituting the first engaging part 70 and the inner face of the engaging receiver 84 of the second engaging part 80.

These gaps permit relative displacement of the division units 54*a*, 54*b* connected by the first engaging part 70 and the second engaging part 80 in the axial direction 19 and the diametrical direction (the second axis-perpendicular direction 30) of the division units 54*a*, 54*b*, which are orthogonal to the mutual butting direction that is the engagement direction of the first engaging part 70 and the second engaging part 80 (the first axis-perpendicular direction 26).

Additionally, as FIG. 26 shows, the depth dimension inside of the engaging receiver 84 in the insertion groove part 82 (the dimension in the first axis-perpendicular direction 26) is made larger than the length of the engaging projection 74 of the first engaging part 70 in the same direction. This facilitates manipulation of engaging the engaging projection 74 in the engaging receiver 84.

When the first engaging part 70 and the second engaging part 80 are engaged, based on the elasticity of the main rubber elastic body 16 compressed between the division units 54*a*, 54*b*, the engagement face 78 of the engaging projection 74 is kept in a contact engagement state in relation to the engaging receiver 84. Also, in this contact engagement state, there may be a gap between the both overlapped circumferential end faces in the division unit 54*a* and the division unit 54*b*.

As FIG. 25 shows, the division unit 54*a* and the division unit 54*b* are fitted to the outer peripheral face of the mount main unit 17 from the opposite sides of the first axis-perpendicular direction 26. The division units 54*a*, 54*b* are connected so as to constitute the outer tube member 18, whereby the medium members 14, 14 of the mount main unit 17 are fitted to the inner peripheral face of the outer tube member 18, and the outer tube member 18 is mounted to cover the outer peripheral face of the mount main unit 17.

The division units 54*a*, 54*b* are connected by the first engaging part 70 and the second engaging part 80, whereby the main rubber elastic body 16 of the mount main unit 17 disposed between the division units 54*a*, 54*b* is compressed in the second axis-perpendicular direction 30 orthogonal to the butting direction of the division units 54*a*, 54*b*.

Specifically, the inner peripheral faces of the division units 54*a*, 54*b* are abutted against the outer peripheral faces of the medium members 14, 14 which are covered with the fitting rubber layer 52. By so doing, the medium members 14, 14 are pressed inside in the second axis-perpendicular direction 30, thereby compressing the main rubber elastic body 16 between the inner shaft member 12 and the medium members 14. This reduces the tensile stress of the main rubber elastic body 16, thereby improving the durability. In this embodiment, the outer peripheral faces of the medium members 14, 14 superposed to the inner peripheral faces of the division units 54*a*, 54*b* are incline surfaces that are inclined to the outside in the second axis-perpendicular direction 30 as they go to the central side in the first axis-perpendicular direction 26. Therefore, the division units 54*a*, 54*b* are made to approach each other in sliding contact with the medium members 14, 14, so that they are connected. By so doing, the medium members 14, 14 are pressed to the inside where they approach one another in the second axis-perpendicular direction 30.

The opening of the recess 42 formed in the main rubber elastic body 16 is closed by the outer tube member 18, while the communication passage 46 opens to the axial outsides on the radial inside of the outer tube member 18. Consequently, the recess 42 opens to the atmosphere via the communication passage 46. This avoids sealing of the recess 42, thus reducing or preventing the effect of air spring, while enabling emission of water etc. that enters the recess 42 via the communication passage 46.

The tip parts of the pair of stopper protrusions 28, 28 provided at the mount main unit 17 are inserted into the stopper concavities 60, 60 provided at the division units 54*a*, 54*b* of the outer tube member 18. The tip part of the stopper protrusion 28 inserted in the stopper concavity 60 is disposed with a prescribed distance (the stopper clearance) from any of the front-back stopper receiving parts 62, 62, the left-right stopper receiving part 64, the upper-lower stopper receiving parts 58, 58 that constitute the wall of the stopper concavity 60.

The contact of the tip part of the stopper protrusion 28 and the front-back stopper receiving part 62 constitutes an axial direction stopper 86 that limits the relative displacement amount between the inner shaft member 12 and the outer tube member 18 in the front-back direction (the axial direction 19). Besides, the contact of the tip part of the stopper protrusion 28 and the left-right stopper receiving part 64 constitutes a first axis-perpendicular direction stopper 88 that limits the relative displacement amount between the inner shaft member 12 and the outer tube member 18 in the left-right direction (the first axis-perpendicular direction 26). Moreover, the contact of the tip part of the stopper protrusion 28 and the upper-lower stopper receiving part 58 constitutes a second axis-perpendicular direction stopper 90 that limits the relative displacement amount between the inner shaft member 12 and the outer tube member 18 in the up-down direction (the second axis-perpendicular direction 30).

In each stopper 86, 88, 90, the stopper protrusion 28 and the stopper receiving part 58, 62, 64 are abutted via the cushion rubber layer 48 covering the stopper protrusion 28, so as to moderate the striking noise and impact on the contact.

Figure 6:
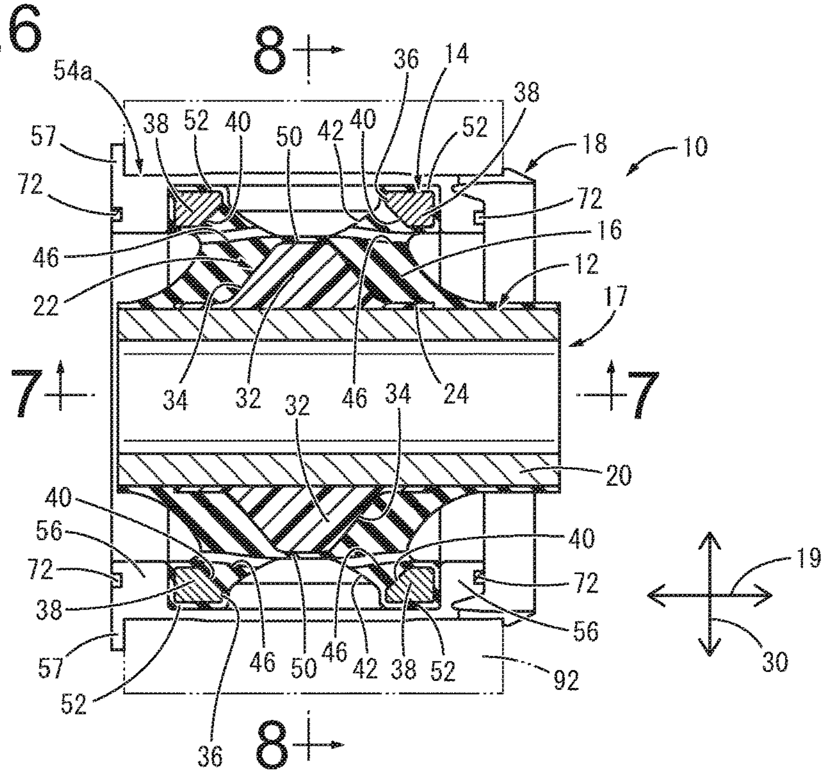
FIG. 6 is a cross sectional view taken along line 6-6 of FIG. 4.
Figure 7:
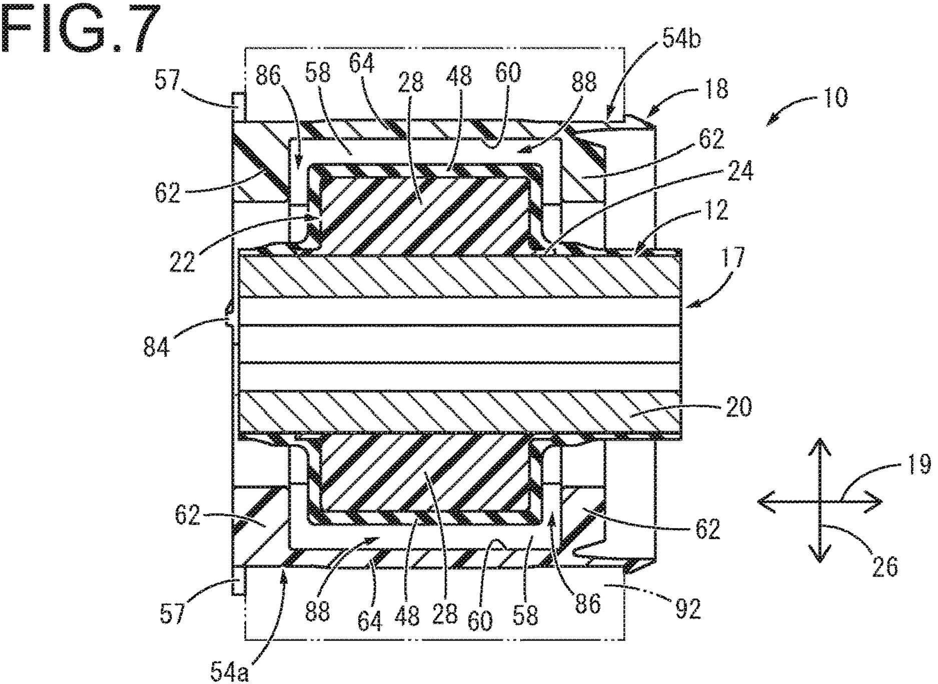
FIG. 7 is a cross sectional view taken along line 7-7 of FIG. 6.
Figure 8:
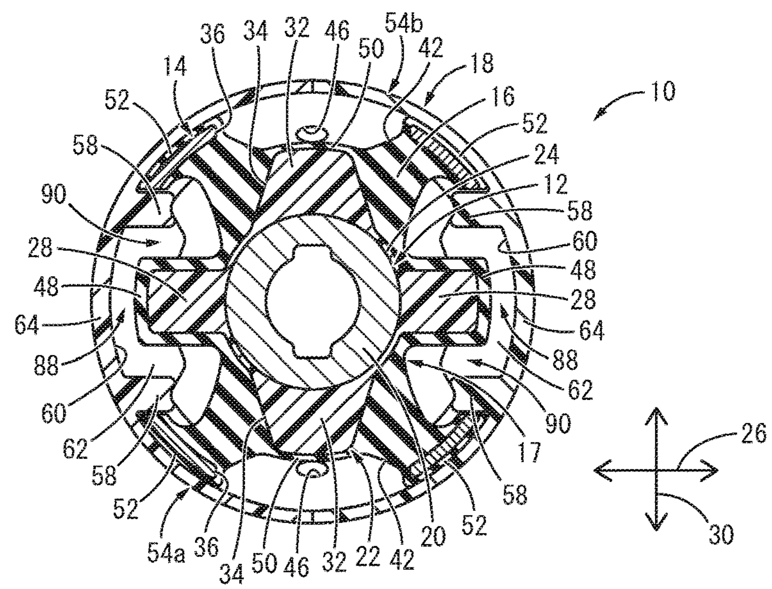
FIG. 8 is a cross sectional view taken along line 8-8 of FIG. 6.
Figure 9:
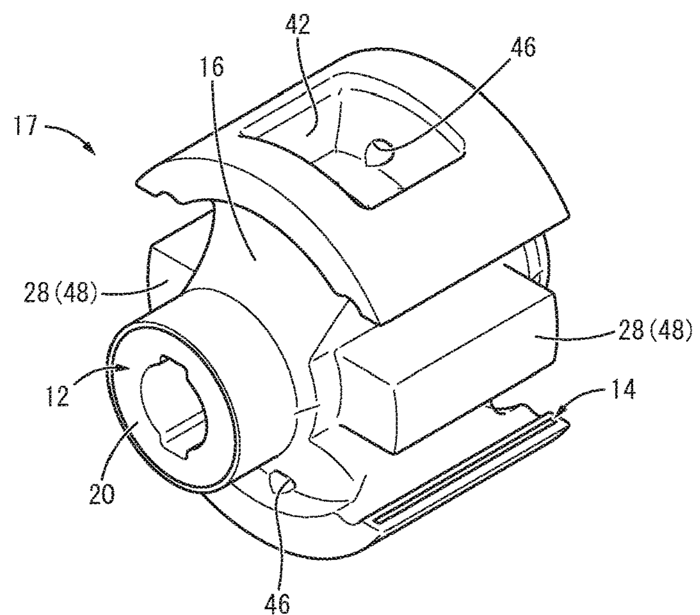
FIG. 9 is a perspective view of a mount main unit of the differential mount of FIG. 1.
Figure 10:
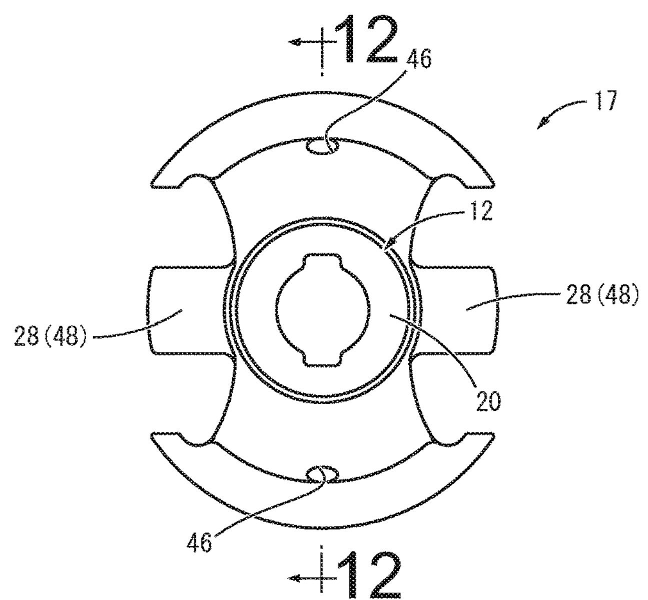
FIG. 10 is a left side view showing the mount main unit of FIG. 9.
Figure 11:
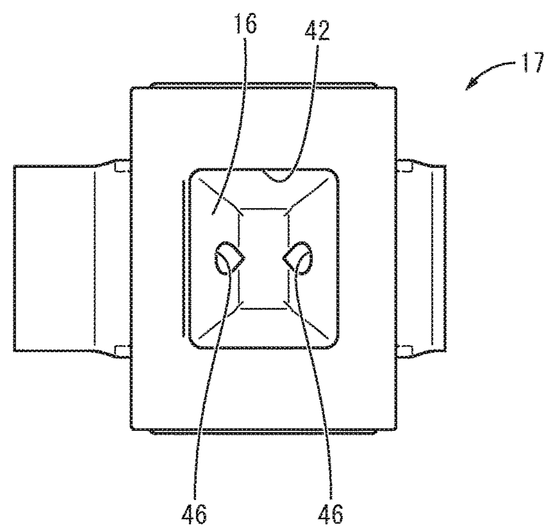
FIG. 11 is a plan view showing the mount main unit of FIG. 9.
Figure 12:
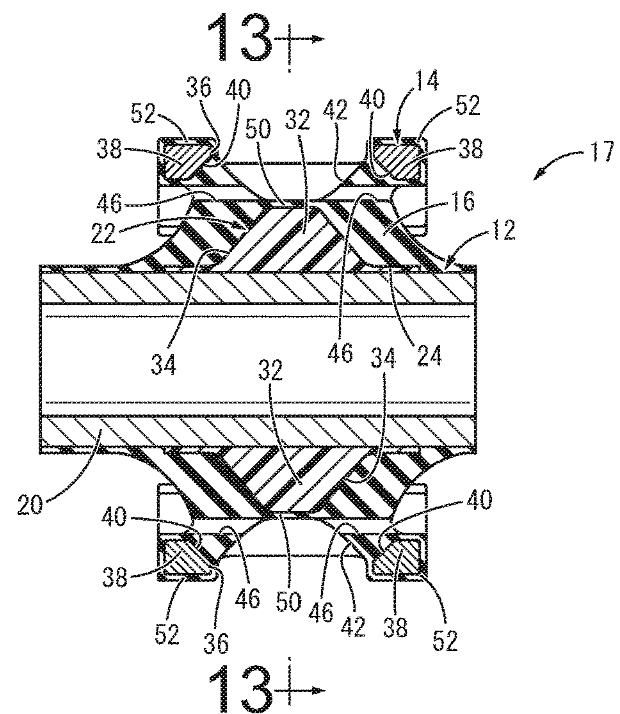
FIG. 12 is a cross sectional view taken along line 12-12 of FIG. 10.
Figure 13:
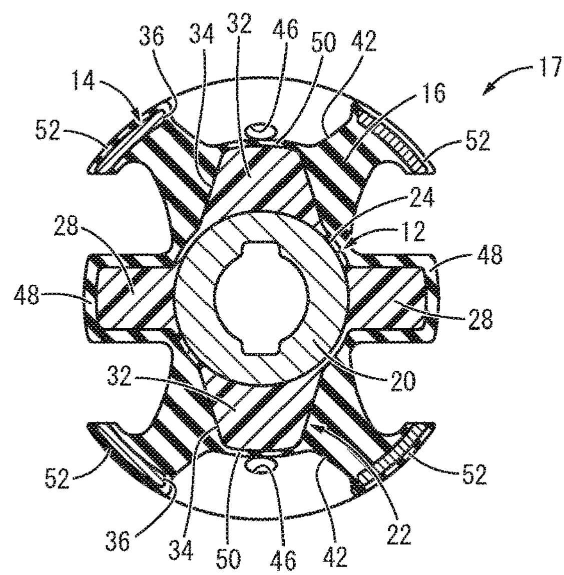
FIG. 13 is a cross sectional view taken along line 13-13 of FIG. 12.
Figure 14:
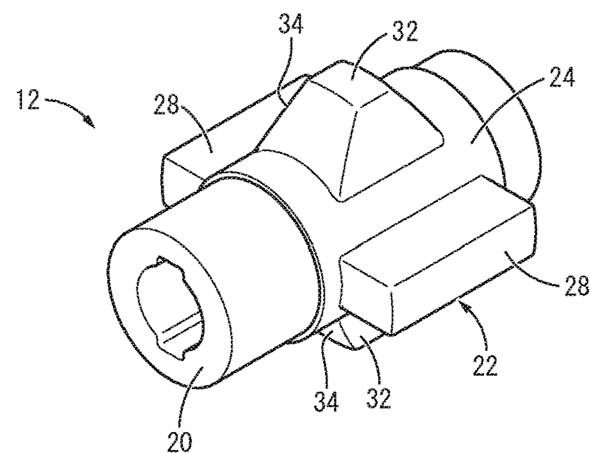
FIG. 14 is a perspective view of an inner shaft member equipped with a stopper member constituting the mount main unit of FIG. 9.
Figure 15:
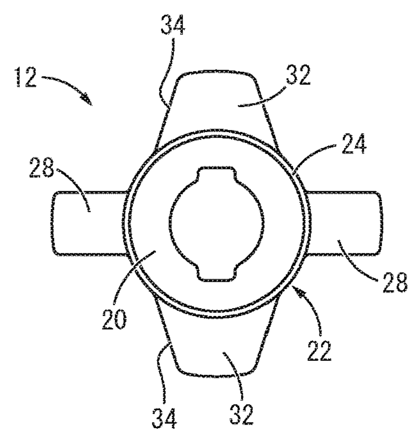
FIG. 15 is a left side view of the inner shaft member equipped with the stopper member of FIG. 14.
Figure 16:
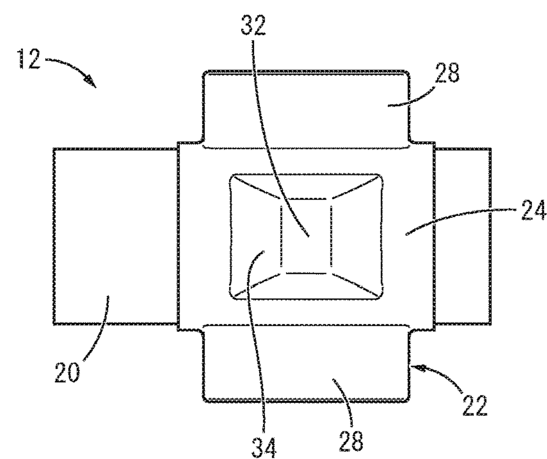
FIG. 16 is a plan view of the inner shaft member equipped with the stopper member of FIG. 14.
Figure 17:
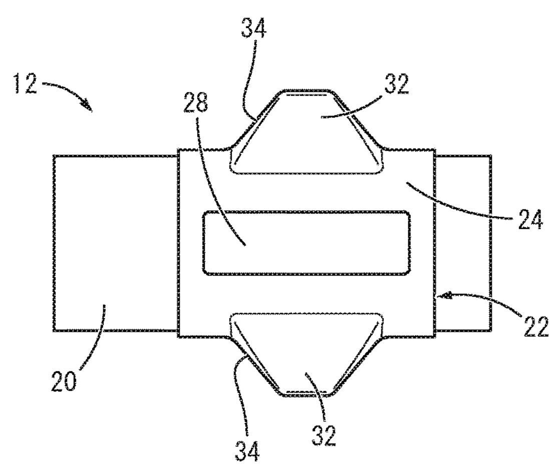
FIG. 17 is a front view of the inner shaft member equipped with the stopper member of FIG. 14.

The differential mount 10 having this structure is fixed by the inner shaft member 12 being mounted to a not-shown differential gear, and by the outer tube member 18 being fitted in an attachment tube part 92 serving as an attachment target member that is provided at a sub frame or the like, as FIGS. 6 and 7 show.

In the present embodiment, the relative displacement between the division units 54*a*, 54*b* is permitted by the gap between the first and second engaging parts 70, 80. Therefore, when the outer tube member 18 constituted by the pair of division units 54*a*, 54*b* is fitted in the attachment tube part 92, the division units 54*a*, 54*b* move to appropriate relative positions, so that the outer tube member 18 takes a form that can be fitted into the attachment tube part 92.

This prevents failures in the attachment of the outer tube member 18 to the attachment tube part 92 resulting from an error during the assembly of the division units 54*a*, 54*b*, and the like. Consequently, it becomes possible to certainly mount the differential mount 10 to a vehicle. The axial attachment position of the outer tube member 18 to the attachment tube part 92 is regulated by contact of the axial end face of the attachment tube part 92 with the outer flange portion 57.

In a state of the differential mount 10 being mounted to the vehicle, when a vibration is input between the differential gear and the sub frame, the main rubber elastic body 16 of the differential mount 10 undergoes elastic deformation, thus reducing vibration transmission between the differential gear and the sub frame.

In this embodiment, the recess 42 is formed in the main rubber elastic body 16, while the part that constitutes the wall inner face of the recess 42 in the surface of the main rubber elastic body 16 is a free surface. Therefore, during elastic deformation, local stress concentration is less likely to occur in the surface of the main rubber elastic body 16, so that the durability of the main rubber elastic body 16 improves. In this way, it is preferable that the recess 42 is provided for the main rubber elastic body 16, but the recess 42 is not indispensable.

In the main rubber elastic body 16, there is formed the communication passage 46 that opens the recess 42 to the atmosphere. Thus, during the elastic deformation of the main rubber elastic body 16, the action of the air spring in the recess 42 is prevented, so that it becomes easy to suitably set the spring characteristics of the differential mount 10. Specifically, for example, by avoiding the action of the air spring in the recess 42, it is possible to prevent the spring in the up-down direction of the differential mount 10 from getting hard. However, by providing the recess 42 whose opening is covered by the outer tube member 18 as a substantially sealed space, instead of providing the communication passage 46, it is possible as well to adjust the spring characteristics of the differential mount 10, assertively utilizing the air spring.

If a large load is input between the differential gear and the sub frame, the relative displacement amount between the inner shaft member 12, which is fixed to the differential gear, and the outer tube member 18, which is fixed to the sub frame, is limited by all the stoppers 86, 88, 90. This limits the deformation amount of the main rubber elastic body 16, so that the durability of the main rubber elastic body 16 improves.

Here, the stoppers 86, 88, 90 are constituted by the contact between the tip parts of the pair of stopper protrusions 28, 28 provided in the inner shaft member 12 and the stopper receiving parts 58, 62, 64 provided in the outer tube member 18. The contact sections of the stopper protrusion 28 relative to the stopper receiving parts 58, 62, 64 are covered with the cushion rubber layer 48 formed integrally with the main rubber elastic body 16, and they are set in separate locations from the main rubber elastic body 16.

Thus, even if the cushion rubber layer 48 that covers the stopper protrusion 28 is damaged by the action of the stopper load, the cracking etc. of the cushion rubber layer 48 occurs in a location that covers the tip part of the stopper protrusion 28 and is circumferentially separated from the main rubber elastic body 16. This prevents the cracking, etc. occurring in the cushion rubber layer 48 from spreading to the main rubber elastic body 16, whereby an effect on the durability of the main rubber elastic body 16 is avoided.

Also, the main rubber elastic body 16 is bonded to the pair of fixation protrusions 32, 32 that protrude to the both sides of the second axis-perpendicular direction 30 orthogonal to the protrusion direction of the pair of stopper protrusions 28, 28. However, all the stoppers 86, 88, 90 are constituted by the pair of stopper protrusions 28, 28, so that the stopper load does not act on the pair of fixation protrusions 32, 32.

The rubber sheath layer 50 formed integrally with the main rubber elastic body 16 is provided in the proximity of the main rubber elastic body 16 so as to cover the pair of fixation protrusions 32, 32. However, in such a state, the rubber sheath layer 50 is not damaged by the action of a large load, and the durability of the main rubber elastic body 16 is not adversely affected. Additionally, in this embodiment, the stopper receiving parts 58, 62, 64 are located out of the divided positions in the outer tube member 18 and formed integrally with each division unit 54*a*, 54*b*. Thus, it is possible to easily get load-bearing strength for the stopper receiving parts 58, 62, 64.

Moreover, the division units 54*a*, 54*b* are connected to each other with sufficient strength by the engagement of the first engaging part 70 and the second engaging part 80. Especially in this embodiment, the engagement structures that are constituted by the first engaging part 70 and the second engaging part 80 are provided at the both circumferential ends 68, 68 of the division units 54*a*, 54*b* and they are provided at both axial sides thereof. Consequently, the division units 54*a*, 54*b* are connected by four engagement structures with excellent reliability.

The guide face 76 of the engaging projection 74 is abutted against the engaging receiver 84, so that the elastic support part 72 undergoes elastic deformation as it flexes in the thickness direction by abutment reaction force acting on the elastic support part 72. This enables the engaging projection 74 to go beyond the engaging receiver 84 so as to be engaged in it. Consequently, only by making the division units 54*a*, 54*b* approach each other while positioning them relative to one another, the engagement of the engaging projection 74 and the engaging receiver 84 is readily realized.

In addition, two first engaging parts 70 are provided at each axial side of one of the division units 54*a*, while two second engaging parts 80 are provided at each axial side of the other division unit 54*b*. Thus, when the division units 54*a*, 54*b* are made to approach each other and the first engaging parts 70 and the second engaging parts 80 are engaged, moment resulting from friction resistance, etc. by the sliding contact of the engaging projection 74 and the engaging receiver 84 is reduced or avoided by mutual cancellation. This facilitates the connection work of the division units 54*a*, 54*b*.

The engagement connection structures of the division units 54*a*, 54*b* by the first engaging part 70 and the second engaging part 80 are disposed in the radially middle portions of the division units 54*a*, 54*b*. By so doing, the first engaging part 70 and the second engaging part 80 can be prevented from being provided at the outer peripheral face of the outer tube member 18 that is fitted in the attachment tube part 92. This makes it possible to avoid problems, e.g., engagement cancellation of the first engaging part 70 and the second engaging part 80 as a result of contact of the engaging projection 74 with the attachment tube part 92 during fitting of the outer tube member 18 into the attachment tube part 92, and a catch of the engagement structure with respect to the attachment tube part 92.

The embodiment of this invention has been described above, but the present invention is not limited by the specific descriptions of the embodiment. For example, the outer tube member 18 is not limited to the two division structure. The outer tube member 18 may have a tubular shape that is not a division structure, or it may be divided into three or more. In addition, for the outer tube member 18, it is possible to use not only a structure of circumferential division but also a structure of axial division.

The connection method of the division units 54*a*, 54*b* in the outer tube member 18 is nothing but an example. The method is not limited to the non-adhesive engagement connection using the first and second engaging parts 70, 80, and alternatively, the division units 54*a*, 54*b* can be fixed by means of welding, adhesion, or the like. As well, the division direction of the division units 54*a*, 54*b* may be a direction other than the first axis-perpendicular direction 26, such as the second axis-perpendicular direction 30.

Furthermore, it is also possible that the first engaging part 70 and the second engaging part 80 are provided at the both circumferential ends 68, 68 of one of the division units 54*a*, while the second engaging part 80 and the first engaging part 70 which correspond are provided at the both circumferential ends 68, 68 of the other of the division units 54*b*. According to this, it is also possible to provide the division unit 54*a* and the division unit 54*b* as the same structure, thereby enabling productivity improvement, facilitation of part administration, and the like by use of common parts.

In the aforesaid embodiment, there is shown as an example the pair of medium members 14, 14 opposed in the second axis-perpendicular direction 30. However, the specific structure for the medium member is not interpreted in a limited way. For example, it is also possible to employ a structure wherein a pair of annular medium members are disposed with a prescribed axial distance, and these medium members and the inner shaft member 12 are elastically connected to one another by the main rubber elastic body 16. The medium member is dispensable.

The present invention is applicable not only to a differential mount, but also to a tubular vibration-damping device used as an engine mount, a sub frame mount, a body mount, and the like. Moreover, the application range for this invention is not limited to an automotive tubular vibration-damping device, and this invention can be preferably adopted also for a tubular vibration-damping device used for a motorcycle, a railway vehicle, an industrial vehicle, or the like.

What is claimed is:

1. A tubular vibration-damping device comprising:

a vibration-damper device main unit having an inner shaft member and a main rubber elastic body fixed to an outer peripheral face of the inner shaft member;

a tubular outer tube member mounted on an outer peripheral face of the vibration-damper device main unit;

a pair of stopper protrusions protruding to opposite sides of a first axis-perpendicular direction which is perpendicular to an axial direction of the inner shaft member at an axially middle portion of the inner shaft member;

a cushion rubber layer formed integrally with the main rubber elastic body and fixed to faces of the pair of stopper protrusions;

a pair of stopper concavities provided at opposite sides in the first axis-perpendicular direction and that opens in an inner peripheral face of the outer tube member so as to open radially inwardly in the first axis-perpendicular direction, and the pair of stopper concavities receives protruding end parts of the pair of stopper protrusions that are inserted respectively in the pair of stopper concavities, each of the pair of stopper concavities having a wall including an axial direction stopper receiving part, a first axis-perpendicular direction stopper receiving part, and a second axis-perpendicular direction stopper receiving part that are opposed to and spaced away from a respective stopper protrusion of the pair of stopper protrusions in each of the axial direction, the first axis-perpendicular direction, and a second axis-perpendicular direction orthogonal to the axial direction and the first axis-perpendicular direction; and an axial direction stopper, a first axis-perpendicular direction stopper, and a second axis-perpendicular direction stopper being constituted by contact of the axial direction stopper receiving part, the first axis-perpendicular direction stopper receiving part, and the second axis-perpendicular direction stopper receiving part of each of the pair of stopper concavities and the pair of stopper protrusions respectively, such that the axial direction stopper, the first axis-perpendicular direction stopper, and the second axis-perpendicular direction stopper limit a relative displacement amount between the inner shaft member and the outer tube member.

2. The tubular vibration-damping device according to claim 1, wherein a pair of fixation protrusions is provided at the axially middle portion of the inner shaft member while protruding to opposite sides of the second axis-perpendicular direction, and the main rubber elastic body is fixed to the pair of fixation protrusions.

3. The tubular vibration-damping device according to claim 2, wherein the pair of fixation protrusions and the pair of stopper protrusions are integrally formed as a separate member from the inner shaft member, and the pair of fixation protrusions and the pair of stopper protrusions are firmly provided at the inner shaft member.

4. The tubular vibration-damping device according to claim 1, wherein at least one medium member is disposed separately from the inner shaft member on an outer peripheral side thereof, and the inner shaft member and the at least one medium member are elastically connected to each other by the main rubber elastic body so that the inner shaft member, the at least one medium member, and the main rubber elastic body constitute the vibration-damper device main unit, and the at least one medium member is fitted to the inner peripheral face of the outer tube member so that the outer tube member is mounted to the outer peripheral face of the vibration-damper device main unit.

5. The tubular vibration-damping device according to claim 4, wherein the at least one medium member comprises a pair of medium members, and the pair of medium members is disposed separately on opposite sides of the inner shaft member in the second axis-perpendicular direction, and the inner shaft member and the pair of medium members are elastically connected to one another by the main rubber elastic body, and the pair of medium members is fitted to the inner peripheral face of the outer tube member.

6. The tubular vibration-damping device according to claim 1, wherein the main rubber elastic body has a recess opening to an outer periphery at each side of the second axis-perpendicular direction, and an inner face of the recess constituted by the main rubber elastic body is a free surface.

7. The tubular vibration-damping device according to claim 1, wherein the outer tube member includes a pair of division structures mounted to the vibration-damper device main unit from the opposite sides of the first axis-perpendicular direction.

8. The tubular vibration-damping device according to claim 1, wherein each of the pair of stopper protrusions includes a substantially rectangular shape having a length disposed along the axial direction that is larger than a width that is disposed along either the first axis-perpendicular direction or the second axis-perpendicular direction.

9. A tubular vibration-damping device comprising:

a vibration-damper device main unit having an inner shaft member and a main rubber elastic body fixed to an outer peripheral face of the inner shaft member;

a tubular outer tube member mounted on an outer peripheral face of the vibration-damper device main unit;

a pair of stopper protrusions protruding to opposite sides of a first axis-perpendicular direction at an axially middle portion of the inner shaft member;

a cushion rubber layer formed integrally with the main rubber elastic body and fixed to faces of the pair of stopper protrusions;

a pair of stopper concavities provided in an inner peripheral face of the outer tube member such that the pair of stopper concavities receives the pair of stopper protrusions that are inserted respectively in the pair of stopper concavities, each of the pair of stopper concavities having a wall opposed to a respective stopper protrusion of the pair of stopper protrusions in each of an axial direction, the first axis-perpendicular direction, and a second axis-perpendicular direction orthogonal to the first axis-perpendicular direction; and an axial direction stopper, a first axis-perpendicular direction stopper, and a second axis-perpendicular direction stopper being constituted by contact of the wall of each of the pair of stopper concavities and the pair of stopper protrusions respectively, such that the axial direction stopper, the first axis-perpendicular direction stopper, and the second axis-perpendicular direction stopper limit a relative displacement amount between the inner shaft member and the outer tube member, wherein the main rubber elastic body has a recess opening to an outer periphery at each side of the second axis-perpendicular direction, and an inner face of the recess constituted by the main rubber elastic body is a free surface, and wherein a communication passage is formed in the main rubber elastic body such that the communication passage opens the recess to an atmosphere.

10. A tubular vibration-damping device, comprising:

a vibration-damper device main unit having an inner shaft member and a main rubber elastic body fixed to an outer peripheral face of the inner shaft member;

a tubular outer tube member mounted on an outer peripheral face of the vibration-damper device main unit;

a pair of stopper protrusions protruding to opposite sides of a first axis-perpendicular direction at an axially middle portion of the inner shaft member;

a cushion rubber layer formed integrally with the main rubber elastic body and fixed to faces of the pair of stopper protrusions;

a pair of stopper concavities provided in an inner peripheral face of the outer tube member such that the pair of stopper concavities receives the pair of stopper protrusions that are inserted respectively in the pair of stopper concavities, each of the pair of stopper concavities having a wall opposed to a respective stopper protrusion of the pair of stopper protrusions in each of an axial direction, the first axis-perpendicular direction, and a second axis-perpendicular direction orthogonal to the first axis-perpendicular direction; and an axial direction stopper, a first axis-perpendicular direction stopper, and a second axis-perpendicular direction stopper being constituted by contact of the wall of each of the pair of stopper concavities and the pair of stopper protrusions respectively, such that the axial direction stopper, the first axis-perpendicular direction stopper, and the second axis-perpendicular direction stopper limit a relative displacement amount between the inner shaft member and the outer tube member, wherein the outer tube member includes a pair of division structures mounted to the vibration-damper device main unit from the opposite sides of the first axis-perpendicular direction, and wherein a first engaging part and a second engaging part configured to be engaged in each other by approach of the pair of division structures are provided at butting ends of the pair of division structures butted to each other, and the pair of division structures are positioned relative to one another by engagement of the first engaging part and the second engaging part in a direction of the engagement, and the pair of division structures is permitted to be relatively displaced in a direction orthogonal to the direction of the engagement of the first engaging part and the second engaging part.

* * * * *